United States Patent [19]
Dabbs

[11] 3,785,697
[45] Jan. 15, 1974

[54] PORTABLE COLLAPSIBLE GARAGE

[76] Inventor: Robert Dabbs, 717 Clarissa St., Pittsburgh, Pa. 15219

[22] Filed: Nov. 16, 1972

[21] Appl. No.: 307,245

[52] U.S. Cl. ............................. 296/136, 150/52 K
[51] Int. Cl. ............................................. B60j 11/00
[58] Field of Search .............. 296/136; 150/52 K; 296/96

[56] References Cited
UNITED STATES PATENTS
2,571,362  10/1951  Hervey .............................. 296/136
3,222,102  12/1965  Lucas ................................ 296/136
3,316,012  4/1967  Thier ................................. 296/136

FOREIGN PATENTS OR APPLICATIONS
217,105  2/1957  Australia ............................ 296/136
1,227,029  8/1960  France .............................. 296/136
525,466  5/1956  Canada ............................. 296/136

*Primary Examiner*—Robert R. Song

[57] ABSTRACT

A portable collapsible garage which includes a flexible waterproof cover mounted on a framework which is foldable into the trunk of the motor vehicle with the framework carrying a reel on which the cover is wound prior to storing.

5 Claims, 6 Drawing Figures

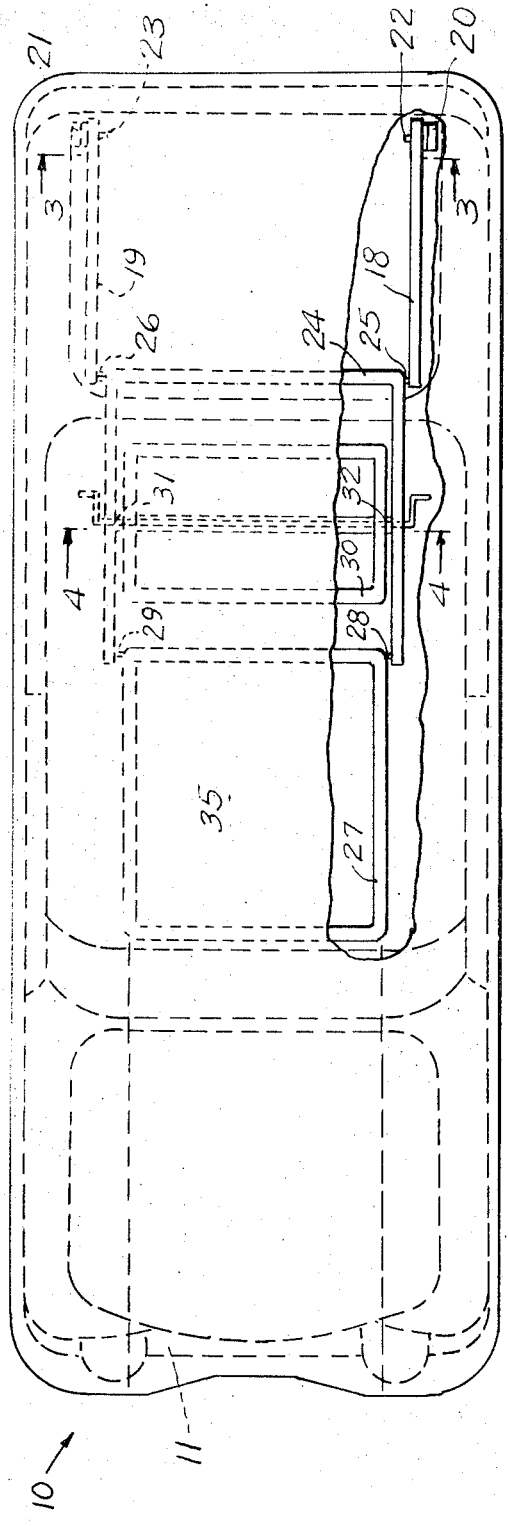
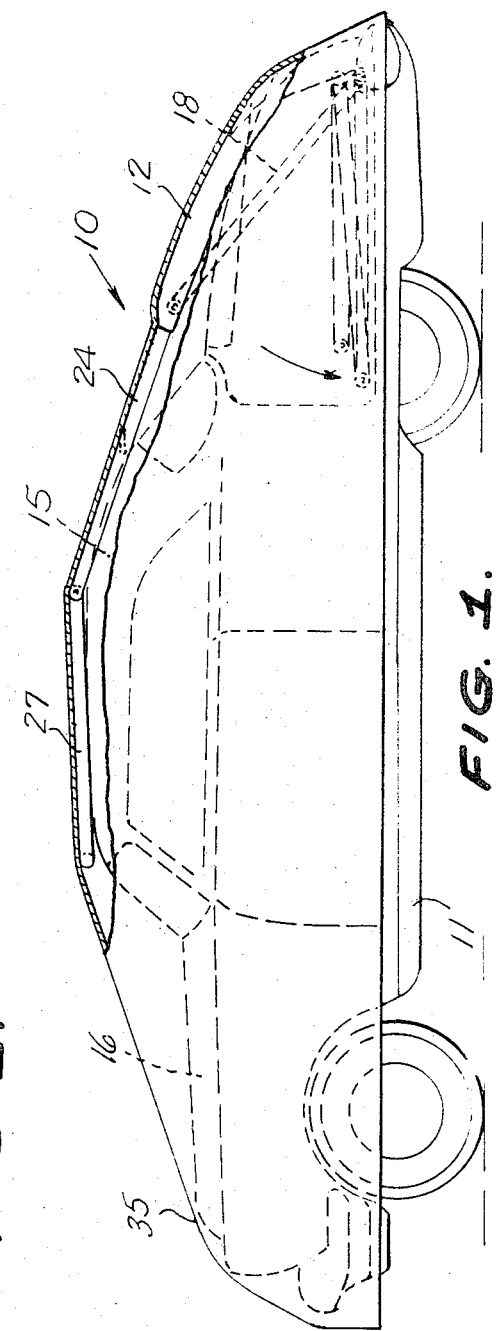

PORTABLE COLLAPSIBLE GARAGE

BACKGROUND OF THE INVENTION

Field of the Invention

The present invention relates to portable collapsible garages which consist of flexible covers which can be used to protect the motor vehicle when it can not be housed in a conventional garage.

SUMMARY OF THE INVENTION

A motor vehicle cover formed of flexible waterproof material is carried on a reel mounted on a folding framework which extends from the trunk of the motor vehicle to permit the cover to be unwound and positioned in protecting relation to the body of the motor vehicle.

The primary object of the invention is to provide a collapsible portable garage for motor vehicles which can be erected and collapsed by one person and which will protect the motor vehicle against both sun and inclement weather.

Other objects and advantages will become apparent in the following specification when considered in the light of the attached drawings.

BRIEF DESCRIPTION OF THE DRAWINGS

FIG. 1 is a side elevation of the invention shown partially broken away and in section for convenience of illustration;

FIG. 2 is a top plan view of the invention shown partially broken away and in section for convenience of illustration;

DESCRIPTION OF THE PREFERRED EMBODIMENT

Figure 3:
FIG. 3 is an enlarged fragmentary transverse sectional view taken along the line 3—3 of FIG. 2, looking in the direction of the arrows.
Figure 4:
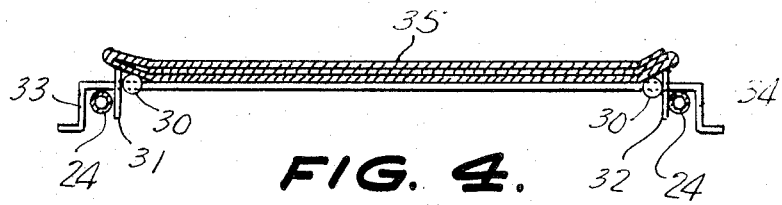
FIG. 4 is an enlarged fragmentary transverse section taken along the line 4—4 of FIG. 2, looking in the direction of the arrows.
Figure 5:
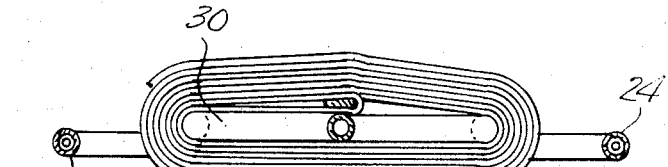
FIG. 5 is a longitudinal sectional view of the reel with the cover wound thereon.

Referring now to the drawings in detail wherein like reference characters indicate like parts throughout the several figures the reference numeral 10 indicates generally a collapsible portable garage constructed in accordance with the invention.

The collapsible portable garage 10 is used with a motor vehicle 11 of generally conventional design and having a trunk lid 12 which hinges at 13 at its lower rear edge. A trunk floor 14 is carried by the motor vehicle 11 beneath the trunk lid 12. The motor vehicle 11 further has a conventional top 15 and hood 16.

The portable collapsible garage 10 includes a framework generally indicated at 17 having a pair of spaced apart parallel generally straight arms 18, 19 which are secured at their rear ends to brackets 20, 21 mounted on the trunk floor 14. Pivot pins 22, 23 secure the arms 18, 19 respectively to the brackets 20, 21 so that the arms 18, 19 may swing upwardly out of the trunk of the motor vehicle 11.

A generally U-shaped member 24 is pivotally secured to the arms 18, 19 by pivot pins 25, 26 respectively. The U-shaped member 24 folds within the arms 18, 19 and when unfolded extends forwardly therefrom.

A generally rectangular frame 27 is pivotally mounted to the forward end of the U-shaped member number 24 by a pair of pivot pins 28, 29. A reel 30 is journalled in a pair of brackets 31, 32 carried by the U-shaped member 24. A crank 33 is secured to one end of the reel 30 and a crank 34 is secured to the opposite end of the reel 30 to permit the reel 30 to be rotated by hand as required.

A flexible waterproof cover 35 is shaped to fit the motor vehicle 11 and is secured to the reel 30 intermediate its side edges and intermediate its opposite ends.

Figure 6:
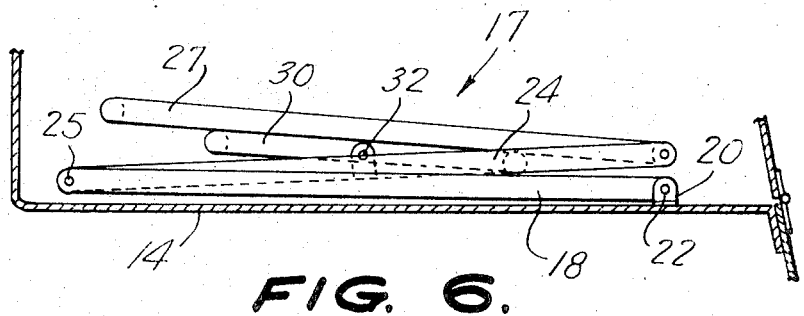
FIG. 6 is a sectional view of the folded framework in the trunk of the vehicle with parts broken away for convenience of illustration.

In the use and operation of the invention the cover 35 is wound on the reel 30 on the framework 17 and contained within the trunk of the motor vehicle 11. The trunk lid 12 is unlatched and opened and the rectangular frame is grasped and pulled from the trunk unfolding as it moves forward over the top 15 of the motor vehicle 11. The cover 35 wound on the reel 30 is then grasped with the hands and pulled forward causing the reel 30 to unwind simultaneously unwinding that portion of the cover which engages over the rear of the vehicle 11. The cover 35 is then unfolded so as to reach the position illustrated in FIG. 1 with the motor vehicle 11 substantially covered. To store the cover 35 it is first folded longitudinally to overlie the reel 30 and the reel 30 is then wound by hand until the cover 35 is completely wound thereon whereupon the framework 17 is folded into the trunk to the position illustrated in FIG. 6 and the trunk lid 12 is closed and latched with the motor vehicle 11 then ready for the road.

Having thus described the preferred embodiment of the invention it should be understood that numerous structural modifications and adaptions may be resorted to without departing from the spirit of the invention.

What is claimed is:

1. A portable collapsible garage for motor vehicles of the type which includes a trunk lid, and a trunk floor underlying the trunk lid, comprising a framework pivotally secured to said trunk floor and movable to a position overlying said vehicle, a flexible waterproof cover for said vehicle, and a reel mounted for rotation on said framework with said cover being wound on said reel for storage within said trunk.

2. A device as claimed in claim 1 wherein said reel is provided with a hand actuated crank for winding said cover on said reel.

3. A device as claimed in claim 1 wherein said framework includes a generally U-shaped member with said reel extending transversely of and journalled in said U-shaped member.

4. A device as claimed in claim 3 wherein said frame includes a generally rectangular frame member pivotally secured to said U-shaped member and extending forwardly of said U-shaped member.

5. A device as claimed in claim 4 wherein said frame member includes a pair of arms pivotally mounted on said trunk floor adjacent the rear end thereof with said U-shaped member pivotally mounted to said arms.

* * * * *